3,490,994
TREATMENT OF LIGNOCELLULOSIC MATERIAL
WITH ORGANOMERCAPTAN
William E. Fisher, Waterville, and Shibley A. Hider,
Toledo, Ohio, assignors to Owens-Illinois, Inc., a
corporation of Ohio
No Drawing. Filed Dec. 30, 1966, Ser. No. 605,978
Int. Cl. D21c 3/20
U.S. Cl. 162—76                     19 Claims

ABSTRACT OF THE DISCLOSURE

Methods of pulping lignocellulosic material by a two-stage treatment, the methods including the steps of (A) digesting said material with a treating liquor containing an organomercaptan such as thioglycolic acid, the treating liquor having an initial pH not substantially exceeding 12.0, the time and temperature of digestion being sufficient to convert the lignocellulosic material to a treated material containing mercaptan-reacted lignin; (B) removing the excess liquor from the treated material of step A; and (C) extracting the mercaptan-reacted lignin obtained by the digested material by contacting the residue with an extractive amidogen compound such as aniline or urea.

---

This invention relates broadly to the art of treating lignocellulosic material, and more particularly to the extraction of organomercaptan-reacted lignin from such material, e.g., wood (both hard and softwoods), that has been cooked or digested with an organic thio compound, especially an organomercaptan, e.g., thioglycolic acid (TGA), HS—CH$_2$—COOH. For purposes of brevity such lignin is hereafter usually referred to as "mercaptan-reacted" lignin.

It was known prior to the present invention to digest or cook wood, specifically spruce sawdust, with an organomercaptan, more particularly TGA. See, for example, Ingeniörs Vetenskaps Akademien, Proceedings No. 103, 75 pp. (1930), "The Mercaptans of Pine Wood," by Bror Holmberg. Holmberg's procedure was to treat, for instance, spruce sawdust with a solution containing TGA and hydrochloric acid. In a second step the mercaptan-reacted lignin was extracted by treating the digested wood with an aqueous solution of caustic soda.

The present invention is based on our discovery that lignocellulosic materials, specifically softwoods and hardwoods, that have been reacted with an organomercaptan, and especially woods that have been cooked or digested in a liquid containing an organomercaptan at an initial pH of from about 7 to 13 and preferably from about 7.0 to 12.0 yield treated woods containing mercaptan-reacted lignin that are amenable to an extractive treatment with a basic (or basic-acting) organic nitrogenous compound containing at least one amino or amido group or both such groups. The amino or amido groups may be unsubstituted or partly or completely substituted. Thus the aforesaid basic or basic-acting nitrogenous extractive agent may be, for example, a primary, secondary or tertiary amine; or, it may be a urea or thiourea wherein the hydrogen atoms attached to the amide nitrogen are unsubstituted or partly or completely substituted with an organic substituent, e.g., a substituted or unsubstituted hydrocarbon radical. Such organic nitrogenous compounds are hereafter for purpose of brevity often designated as "extractive amidogen compound(s)," i.e., "amidogen compound(s)" capable of extracting the aforementioned organomercaptan-reacted lignin from digested wood in which said lignin is present.

By treatment of the digested wood with an extractive amidogen compound, e.g., at a temperature within the range of from room or ambient temperature (20°–30° C.) to 200° C., more selective removal of the mercaptan-reacted lignin is achieved with less degradation of carbohydrate than when aqueous 1–4% solutions of NaOH are employed as an extracting agent at 100°–150° C. Due to the lesser degradation, the yields of pulp are higher. Furthermore, the properties of the paper made from pulps that have been treated with an extractive amidogen compound or compounds for the removal of mercaptan-reacted lignin are better in such properties as, for example, mullen, tensile and ring crush values, than papers prepared from pulps wherein an aqueous solution of NaOH has been employed to extract mercaptan-reacted lignin.

In practicing the present invention any wood or other lignocellulosic material, or mixtures thereof in any proportions, may be cooked or digested with an organomercaptan, with or without first removing the extractives by treating the lignocellulosic material in sub-divided form (e.g., in the form of sawdust, shavings, wafers, and/or chips) with an organic solvent capable of extracting the organic solvent-soluble components of the material. Such lignocellulosic materials include softwoods, hardwoods and fibrous annual plants. Examples of softwoods are balsam fir, Eastern hemlock, jack pine, Eastern white pine, red pine, black spruce, red spruce, white spruce, tamarack and cypress. Examples of hardwoods are black gum, quaking aspen, mixed tomahawk, American beech, paper birch, yellow birch, Eastern cottonwood, sugar maple, silver maple, yellow poplar, black cherry and white oak. Examples of fibrous annual plants are bagasse, hemp and jute. Mixtures of woods or other lignocellulosic materials of different origins may be used if desired, e.g., mixtures of different softwoods, or of different hardwoods, or of one or more softwoods and one or more hardwoods.

Illustrative examples of organomercaptans that may be used to obtain a digested wood containing mercaptan-reacted lignin are those embraced by the general formula (I)          HS—R—(Y)$_n$ 

wherein R represents a divalent radical, more particularly a divalent hydrocarbon radical, Y represents a monovalent substituent bonded directly to R, and $n$ represents a numeral ranging from 0 up to the combining power (i.e., a value that will completely satisfy all valences) of the divalent radical represented by R.

Illustrative examples of divalent radicals represented by R in Formula I are divalent hydrocarbon radicals and, more particularly, divalent aliphatic, e.g., ethylene, propylene (trimethylene), butylene, isobutylene, pentylene, isopentylene, decylene, etc., including divalent cycloaliphatic, e.g., cyclopentylene, cyclohexylene, cycloheptylene, etc.; divalent aromatic, e.g., phenylene, naphthylene, etc.; divalent aliphatic-substituted aromatic, e.g., 2,4-tolylene, ethyl - 2,5 - phenylene, isopropyl-3,4-phenylene, 1 - butyl - 2,4 - naphthylene, etc.; divalent aromatic-substituted aliphatic, e.g., phenylethylene, phenylpropylene, naphthylisobutylene, xylylene, etc.; and radicals that may be classed either as divalent aromatic-substituted aliphatic or divalent aliphatic-substituted aromatic, e.g., 4,alpha-tolylene, 3,beta-phenyleneethyl, 4,alpha-xylylene, 2,gamma-phenylenebutyl, etc. Thus R may represent a divalent hydrocarbon radical represented by the general formula (II)           —Ar—R'—Ar— 

where Ar represents an arylene radical and R' represents an alkylene radical. Preferably the divalent hydrocarbon radical represented by R contains not more than 10 carbon atoms, more particularly from 1 to 8 carbon atoms.

It is not essential that the divalent radical represented by R be composed solely of carbon and hydrogen atoms.

for example, the chain of carbon atoms, whether straight-chain aliphatic of carbocyclic, may be interrupted in the chain by other atoms, e.g., by oxygen and/or sulfur and/or nitrogen atoms bonded directly to carbon atoms of the chain.

Illustrative examples of substituents represented by Y in Formula I are functional groups such as —OH; —CN; —SH; —COOH; —COOR′, wherein R′ is a monovalent hydrocarbon radical corresponding to the divalent hydrocarbon radicals represented by R in Formula II; —COOM, wherein M is a salt-forming cation, e.g., —NH$_4$, or Na, K, Li or other alkali metal, a salt-forming amine such as a mono-, di- or tri-(hydrocarbon-substituted) or -(hydroxyhydrocarbon-substituted) amine, or other salt-forming cation and especially those which yield water-soluble salts when present in the particular thio compound. Or, Y may be a radical represented by

wherein R″ and R‴ are members of the group consisting of hydrogen and monovalent hydrocarbon radicals corresponding to the divalent hydrocarbon radicals represented by R in Formula I.

It will be understood, of course, by those skilled in the art that when $n$ in Formula I represents zero (0), then there are no radicals represented by Y in the formula, which latter then becomes (III)  HS—R wherein R represents a monovalent radical, more particularly a monovalent hydrocarbon radical corresponding to the divalent hydrocarbon radicals represented by R in Formula I. Illustrative examples of mercapto compounds embraced by Formula III are the alkyl (including cycloalkyl), aralkyl, aryl and alkaryl mercaptans, more particularly those which contain form 1 through 10 carbon atoms and especially those having not more than about 8 carbon atoms.

The relatively low water-solubility of the unsubstituted hydrocarbyl mercaptans embraced by Formula III make them much less suitable for use than substituted hydrocarbyl mercaptans having one or more polar or solvating substituent groups. However, if water-solubility of the mercapto reactant is unimportant, e.g., when it is to be used in undiluted state, or in solution in an organic solvent (e.g., ethanol) or in a mixture of water and an organic solvent in which mixture the unsubstituted hydrocarbyl mercaptan is adequately soluble, then a mercaptan within the scope of Formula III may be employed as a treating agent.

Particularly useful in practicing the present invention are organomercaptans represented by the general formula (IV)  HS—Z—(COOR)$_n$ wherein Z represents an alkylene (including cycloalkylene) radical containing from 1 through 10, and preferably from 1 through about 8, carbon atoms; R represents a member of the group consisting of (a) hydrogen, (b) alkyl radicals containing not more than about 10 carbon atoms and preferably a lower alkyl radical (e.g., an alkyl radical containing from 1 through about 6 carbon atoms); and (c) a salt-forming cation, examples of which have been given hereinbefore with reference to M in the grouping —COOM which may be a substituent represented by Y in Formula I; and $n$ represents an integer from 1 up to that of the combining power of the alkylene radical represented by Z. The alkylene radical represented by Z may be straight-chain, branched-chain or cyclic as in, for example, cyclopentyl, cyclohexyl and the like.

More specific examples of mercapto compounds em-braced by Formula IV are monocarboxylic and polycarboxylic acids such as those having the formulas

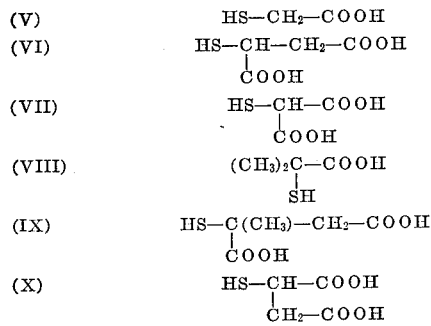

the ammonium, alkali-metal (sodium, potassium, lithium, etc.) and other water-soluble salts of the aforementioned mono- and di-carboxylic acids; and the cyclopentyl and cyclohexyl esters, as well as the methyl, ethyl and propyl through pentyl (normal or isomeric alkyl) esters of the aforesaid acids. In the case of the salts and esters of the dicarboxylic acids, one may use either the mono- or di-salt, or a mixture thereof, or a mono- or diester, or a mixture thereof.

As the organomercaptan reactant we prefer to use thio acids, or salts or esters thereof represented by the general formula (XI)  HS—(CH$_2$)$_n$—COOR wherein $n$ represents an integer from 1 to 6, inclusive, more particularly from 1 to 4, inclusive, and R has the same meaning as given above with reference to Formula IV. Thus, compounds embraced by Formula XI may be the thio acid itself or a salt (especially a water-soluble salt) or an ester of such an acid. Of these compounds thioglycolic acid and the water-soluble salts and the lower alkyl esters thereof are the more preferred subgroup. Mixtures of acids and/or salts and/or esters embraced by Formula XI may be used if desired.

Instead of using organomercaptan compounds that are within the scope of Formula XI, one may employ those wherein the —COOR group in that formula has been replaced by other hydrolyzable or solvating groups such as —OH, —CN, —SH,

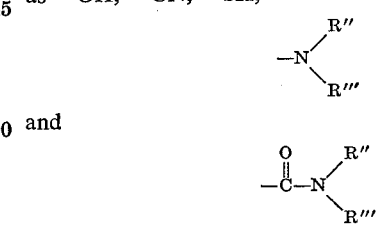

and

wherein R″ and R‴ in the last two groups are hydrogen or a monovalent hydrocarbon radical corresponding to one of the divalent hydrocarbon radicals represented by R in Formula I.

THE EXTRACTIVE AMIDOGEN COMPOUND

Illustrative examples of extractive amidogen compounds that may be employed to extract the mercaptan-reacted lignin from the digested wood or other lignocellulosic material are basic (including basic-acting) nitrogenous compounds having at least one radical represented by the general formula

wherein Y and Y′ each represent hydrogen or an organic substituent or, taken together with the N atom, form a heterocyclic ring. The preferred extractive amidogen compounds are those wherein any other elements of the aforesaid nitrogenous compound consist of elements of the group consisting of carbon, hydrogen and oxygen.

From the foregoing it will be seen that the extractive amidogen compound can be, for example, an unsubstituted mono-, di- or trihydrocarbylamine; a substituted mono-, di- or trihydrocarbylamine (e.g., a mono-, di- or trialkanolamine such as the mono-, di- and triethanolamines); a polyalkylenepolyamine; an aminoalkanoic acid, e.g., aminoacetic acid (glycine), aminopropionic acid, aminobutyric acid, and higher members of the homologous series; and the like. If the amidogen compound is one that contains a plurality of amidogen groups as in an amine or an amide, one or more (including all) of such groups may be unsubstituted, or partly substituted or completely substituted with substituents such as, for instance, hydrocarbyl, and hydroxy-, alkoxy-, carboxy-, acyl-, cyano-, amino- and mercaptohydrocarbyl substituents. Of course, such substituents may be attached directly to the amidogen nitrogen atom when the extractive amidogen compound contains only a single amidogen grouping.

The grouping or radical embraced by Formula XII can be a component of other groups, for instance groupings represented by the following formulas:

(XIII) 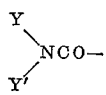

e.g., carbamyl, methylcarbamyl, hydroxy-ethylcarbamyl, etc.

(XIV) 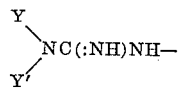

e.g., guanido, methylguanido, etc.

(XV) 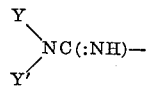

e.g., guanyl, ethylguanyl, hydroxy-methylguanyl, etc.

(XVI) 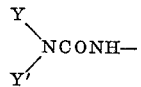

e.g., ureido, methylureido, hydroxy-ethylureido.

In the above Formulas XIII, XIV, XV and XVI, Y and Y' have the same meanings as hereinbefore given with reference to Formula XII.

Illustrative examples of hydrocarbon (hydrocarbyl) radicals which Y and Y' can represent are aliphatic [e.g., methyl, ethyl and propyl through dodecyl (both normal and isomeric forms), allyl, methallyl, butenyl, crotyl, etc.], including cycloaliphatic (e.g., cyclopentyl, cyclopentenyl, cyclohexyl, cyclohexenyl, cycloheptyl, etc.); aryl (e.g., phenyl, biphenylyl or xenyl, naphthyl, etc.); aliphatic-substituted aryl (e.g., tolyl, xylyl, ethylphenyl, 2-butylphenyl, tert.-butylphenyl, etc.) and aryl-substituted aliphatic, (e.g., benzyl, phenylethyl, tolylethyl, phenylpropyl, etc.). Illustrative examples of hydroxy-, alkoxy-, carboxy-, acyl-, cyano-, and amino- and mercaptohydrocarbyl radicals that both Y and Y' in Formulas XII through XVI can represent are the corresponding derivatives of the hydrocarbon radicals just mentioned.

The nitrogen atom of the radical represented by Formula XII may be bonded directly to a grouping represented by Y₁ (not shown) that has the same meaning as Y and Y' in Formula XII. Hence, when such Y₁ represents hydrogen and Y and Y' also each represent hydrogen, the extractive amidogen compound is ammonia.

The extractive amidogen compounds employed in practicing our invention include but are not limited to those embraced by the following general formulas:

(XVII) 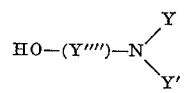

(XVIII) 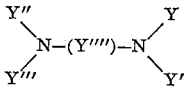

wherein Y and Y' have the same meanings as given above with reference to Formulas XII through XVI; Y'' and Y''' can be any of the substituents represented by the aforementioned Y and Y' or any other monovalent radical including those represented by Formulas XIII through XVI; and Y'''' represents a divalent organic radical such as, for instance, a divalent hydrocarbon radical (e.g., alkylene, arylene, aralkylene, alkarylene, etc.), a divalent hydrocarbon radical containing at least one ether linkage (e.g., one, two, three or any higher number of ether linkages), an s-triazinylene radical (a divalent triazine), a pyrimidylene radical (a divalent pyrimidine), a triazolylene radical (a divalent triazole), etc. If the structure so permits, any number of NYY' or of NY''Y''' groups (Formula XVIII) may be attached to the divalent radical represented by Y''''.

Other and more specific examples of extractive amidogen compounds that may be employed (singly or a plurality thereof) as an extractant of the mercaptan-reacted lignin include urea, thiourea, diurea, diethylenetriurea, methylurea, phenylthiourea, asymmetrical diethylurea, guanidine, dicyandiamide, guanylurea, guanylthiourea, biguanide, monophenylbiguanidine, 1-aminoguanidine (guanylhydrazine), and the like.

Still other examples of extractive amidogen compounds that may be used include:

The mono-, di- and trimethyl- through -dodecylamines (both normal and isomeric forms) and wherein the secondary and tertiary amines are either symmetrical or unsymmetrical, e.g., N-ethyl-N-butylamine.

The mono-, di- and triphenylamines, the mono-, di- and tritolylamines, the mono-, di- and tribenzylamines, the mono-, di- and tri(cyclohexyl)amines, and wherein the secondary and tertiary amines are either symmetrical or unsymmetrical.

The mono-, di- and tri-n-propanol- and -isopropanolamines and higher members of the homologous series, wherein the secondary and tertiary amines are either symmetrical or unsymmetrical.

Amines such as 2-amino-4-methylpentane

[CH₃CHNH₂CH₂CH(CH₃)₂]

and 3-amino-5-methylpentane.

The alkylenepolyamines (polyaminoalkanes), e.g.,

Ethylenediamine (1,2-ethanediamine)
1,2-diaminopropane (propylenediamine)
1,3-diaminopropane (NH₂CH₂CH₂CH₂NH₂)
3-diethylaminopropylamine
 [(C₂H₅)₂NCH₂CH₂CH₂NH₂]
1,3-diaminobutane (NH₂CH₂CH₂CHNH₂CH₃)
1,3-bis-ethylaminobutane
 [C₂H₅NHCH₂CH₂CHNH(C₂H₅)CH₃]
1,4-diaminobutane
1,5-diaminopentane
1,6-diaminohexane
1,7-diaminoheptane
1,8-diaminooctane
Diethylenetriamine (NH₂CH₂CH₂NHCH₂CH₂NH₂)
Triethylenetetramine [NH₂(CH₂CH₂NH)₂CH₂CH₂NH₂]
Tetraethylenepentamine
Pentaethylenehexamine
Propylenediamine (1,2-diaminopropane)
Hydroxyethyl ethylenediamine
 (NH₂CH₂CH₂NHCH₂CH₂OH).

Melamine and the various other amino-1,3,5-triazines containing at least one —NYY' radical, where Y and Y' have the same meanings as in Formula XII, numerous examples of which compounds are given, for instance, in Patents Nos. 2,320,818 and No. 2,361,823.

Aminopyrimidines and the various other aminodiazines containing at least one —NYY' radical, where Y and Y' have the same meanings as in Formula XII, numerous examples of which compounds are given, for instance, in Patent No. 2,379,691.

Guanazole and the various other aminotriazoles containing at least one —NYY' radical, where Y and Y' have the same meanings as in Formula XII, numerous examples of which compounds are given in, for instance, Patent No. 2,320,820.

Other examples of extractive amidogen compounds that may be employed in practicing this invention include:

The N-alkylanilines, e.g., N-butylaniline, and the C-alkyl-substituted anilines, e.g., o-, m- and p-toluidines.

The arylenediamines, e.g., o-, m- and p-phenylenediamines, and the o-, m- and p-tolylenediamines.

Polyamines wherein the hydrocarbon chain is interrupted by other atoms such as oxygen atoms, e.g., Bis(3-aminopropyl) ether
    ($NH_2CH_2CH_2CH_2OCH_2CH_2CH_2NH_2$)
Bis(4-aminobutyl) ether
Bis(5-aminoamyl) ether
Bis(6-aminohexyl) ether
p,p'-Diaminodiphenyl ether.

Other amino-substituted aromatic compounds, e.g., benzidine, (4,4'-diaminobiphenyl); 2-aminobenzidine; and p,p'-diaminodiphenylmethane.

Aminoalcohols, e.g., 4-amino-2-butanol ($CH_3CHOHCH_2CH_2NH_2$)
1-methylamino-2-propanol ($CH_3NHCH_2CHOHCH_3$)
5-isopropylamino-1-pentanol
    [$HOCH_2CH_2CH_2CH_2CH_2NHCH(CH_3)_2$].

Substituted hydrazines such as methylhydrazine, 1,1-dimethylhydrazine, ethylhydrazine, benzylhydrazine, carbamylhydrazine (semicarbazide).

TREATMENT OF LIGNOCELLULOSIC MATERIAL WITH AN ORGANOMERCAPTAN

The treatment of wood with an organomercaptan is described in, for example, the aforementioned Holmberg publication. Other methods of treating wood and other lignocellulosic materials with an organomercaptan are described in, for example, the copending application of Carl A. Johnson, Ser. No. 606,024, filed concurrently herewith, assigned to the same assignee as the present invention, and which by this cross-reference is made a part of the disclosure of the instant application.

The present invention is especially advantageous in the extraction of mercaptan-reacted lignins from lignocellulosic materials that have been treated with a liquor containing an organic thio compound at an initial pH not exceeding 12.0 or about 12.0, e.g., at an initial pH of less than 12.0 including a pH of from 7.0 to 11.0 or 11.5, as well as those wherein treatment is effected at an initial pH of 7.0 and then becomes more acidic, during treatment, to a pH of, for example, 3.0. Usually the initial pH is on the alkaline side; that is, at a pH from above 7.0, e.g., from 7.1 to less than 12 (for instance 11.9).

Chemical treatment with the organomercapto compound may be effected at a temperature within the range of, for instance, from 50° C. (preferably at least about 95°–100° C.) to 200° C., more particularly from about 120° to 190° C., and still more particularly at from about 150°–180° C. The time of treatment varies, for example, from ½ to 5 hours or more. This time period and the reaction temperature depend upon such influencing factors as, for instance, the type and degree of division of the lignocellulosic material being treated, the type, amount and concentration of the organomercapto compound in the treating liquor, the type and size of digester used, and other influencing factors.

The amount of organic thio treating agent, e.g., TGA, to oven-dried (O.D.) lignocellulosic material may be within the weight range of, for example, from about 1:1 (i.e., about 50% by weight of each) to 1:40 (i.e., about 2.5% by weight of the organomercaptan reactant based on the weight of the O.D. lignocellulosic material). Usually TGA or equivalent (in its effectiveness as a reactant) organomercaptan is employed in a weight range of from about 0.05 to about 0.25 of the treating agent to 1.0 of the O.D. lignocellulosic material; that is, the organomercaptan is used in an amount corresponding to from about 5 to about 25 weight percent based on the weight of the O.D. lignocellulosic material. The amounts of the organomercaptan specified above are preferred for practical reasons, e.g., the relatively high cost of organomercaptan compounds. However, larger amounts are operative in which case less severe cooking and amidogen-extraction conditions are, in general, required.

The substantially pure organic thio compound, or a crude form thereof such as is obtained commercially in its preparation, or mixtures of organic thio compounds may be employed as the reactive agent of the treating liquor. Minor amounts (less than 50% by weight) of inorganic thio reactants, e.g., sodium sulfhydrate (NaSH), sodium sulfide ($Na_2S$), sodium polysulfide, etc., may be used in the form of an admixture with the organic thio compound.

Water is preferably used as the liquid reaction medium of the mercaptan cooking liquor. However, other inert solvents or mixtures of inert solvents may be employed if desired. The pH of the cooking liquor is preferably adjusted by the addition of alkaline inorganic compounds such as NaOH or $Na_2CO_3$, but alkaline organic compounds also may be used if desired.

The type of reaction vessel required for the cook depends upon such influencing factors as, for example, the conditions of the cook, the properties of the organomercaptan reactant, and the vapor pressure and alkalinity or acidity of the cooking liquor.

In carrying out the treatment of the lignocellulosic material with the organomercapto compound, the lignocellulosic material, in a suitably subdivided form, is saturated and/or covered with, or suspended in, a liquor containing the organomercapto compound. It is then cooked or digested for a period of time and at a temperature and pressure which depends upon such influencing factors as, for example, the type and degree of division of the lignocellulosic material being treated; the type, amount and concentration of the organomercapto compound in the treating liquor; the type and size of digester being used; and the degree of reaction desired. At the end of the cooking period, the liquor is preferably recovered, e.g., by draining, and the residue is washed, e.g., with hot water. The washed residue is then ready for extraction with an amidogen compound to remove the mercapto-reacted lignin.

The recovered liquor from the initial digestion may contain a significant amount of unused cooking chemicals. This liquor may be recycled in the process after making up for the spent chemicals; or the residual chemicals may be separated from the liquor by such methods as ion exchange, solvent extraction, distillation, dialysis, etc., for reuse in the process.

TREATMENT OF MERCAPTAN-REACTED LIGNOCELLULOSIC MATERIAL WITH AN EXTRACTIVE AMIDOGEN COMPOUND

In effecting the nitrogenous extraction, the mercaptan-reacted material, e.g., the washed residue from the previously described treatment of lignocellulosic material with an organomercaptan, is either transferred to a separate extraction vessel, the type of which will vary with the particular extraction conditions that are deemed necessary or advisable; or, retained in the digester previously used for the mercaptan reaction. The mercaptan-reacted material is brought into contact with the amidogen extractant, preferably by covering it with or suspending it in the extractive fluid. It is then heated for a period of time and at a temperature and pressure which depend upon such influencing variables as, for example, the particular extractant used, the degree of division of the material being extracted, the particular organomercaptan reactant and the conditions used in the initial treatment of the lignocellulosic material, the type of lignocellulosic material, the concentration of the amidogen compound in the extraction fluid, and the degree of extraction and pulping desired.

In extracting the mercaptan-reacted lignin from the lignocellulosic material that has been treated with an organic thio compound, the nitrogenous extractant may be used in undiluted form providing it is a liquid at the extraction temperature, or it may be employed in the form of a solvent solution thereof, e.g., dissolved in water and/or methanol, ethanol, isopropanol or other lower alkanol and/or other organic solvent for the said extractant. Crude commercial mixtures of amidogen compounds, e.g., mixtures of amines may be used if desired. Alkaline inorganic agents such as NaOH, $Na_2CO_3$, $Na_2S$, NaSH, etc., may be used with the nitrogenous reactant but they are not required for the extraction. Extraction temperatures may range, for instance, from ambient temperature (20°–30° C.) to about 200° C.; and extraction times from about ½ hour to about 3 hours or longer as desired or as conditions may require. Extractions may be carried out at atmospheric pressure at ambient or reflux temperatures, or they may be effected under superatmospheric pressure sufficient to liquify the nitrogenous extractant if otherwise it would be in gaseous state at the extraction temperature.

At the end of the extraction period the residue or pulp is treated to remove the extractive amidogen compound containing mercaptan-reacted lignin. For example, the residue or pulp may be drained and screened to separate the solids which are then defibrated and washed with water or other suitable solvent. When the amidogen compound is, for instance, a water-soluble amine, the solid residue is advantageously washed with hot water. With extractive amidogen compounds such as aniline, substantially pure aniline itself may be used as the washing agent; or a different organic solvent, preferably a water-soluble organic solvent, e.g., methyl or ethyl alcohol, may be employed. The recovered extraction liquors and washings may be either concentrated, if necessary, and reused in the process; or, they may be treated to recover valuable mercaptan-reacted lignin and to purify the unreacted extractant. Only a small amount of the amidogen compound is consumed in the extraction, and the extraction liquor may be repeatedly recycled in the process before any losses need to be replaced. Any ligneous material that precipitates may be removed by any suitable means, e.g., by filtration.

In purifying the nitrogenous extractant and recovering the mercaptan-reacted lignin, the extraction liquor may be treated with, for example, $CO_2$ or a dilute mineral acid such as HCl; an inorganic salt; or an extractant-compatible liquid such as alcohol to precipitate the ligneous material for recovery. Other methods such as dialysis, ion exchange, etc., may also be used to separate the lignin from the amidogen extractant.

If the extractive amidogen compound is volatile, it may be separated from the lignin by distillation.

After washing the pulp, bleaching and/or drying steps are optional depending upon the end use. If bleaching is to be effected, it is usually done before drying of the pulp. Prior to a bleaching step, the crude pulp may be washed with a dilute aqueous solution of an inorganic acid, e.g., a 5% aqueous HCl solution, thereby to insure a more complete and efficient bleaching action than when bleaching is effected in the absence of such a dilute acid wash. The pulp, with or without further treatment as may be required for the particular end use, is then suitable for utilization in making any desired cellulosic product including, for example, paper and related products, cellulose acetate, cellulose xanthate, regenerated cellulose, ethyl cellulose, etc.

In order that those skilled in the art may better understand how the present invention can be carried into effect, the following examples are given by way of illustration and not by way of limitation. All parts and percentages are by weight unless otherwise stated.

EXAMPLE 1

This example illustrates the digestion of a hardwood, specifically black gum, with an organomercaptan, more particularly TGA, at an initial pH of 7.0; and, in a second step, extracting in one case the mercaptan-reacted lignin still retained by the treated wood with (a) a strong inorganic base, viz, an aqueous solution of sodium hydroxide, and in another case with (b) an extractive amidogen compound of the kind used in practicing this invention, specifically 100% monoethanolamine (MEA).

The apparatus employed and the general procedure followed were as follows:

A 600-gram charge (based on the oven-dried weight) of air-dried black gum chips from which the isopropanol-soluble extractives had been previously removed, and a total of 2700 ml. of liquor containing 38.4 grams of thioglycolic acid and 14.4 grams of NaOH for adjusting the liquor pH to 7.0, were charged into a stationary digester. The mixture, at 4.5 to 1 liquor-to-wood ratio, was heated steadily over a period of 50 minutes to 150° C. and maintained thereat, under the 66 pounds gauge pressure generated by the mixture, for 2 hours. It was then cooled to approximately 100° C. over a period of 45–50 minutes after which the charge was removed from the digester and filtered to separate the TGA-reacted chips from the spent liquor. The chips were washed with hot water to remove the residual cooking liquor and then separated into two equal portions according to weight after blotting to thoroughly remove the adhering water.

One portion of the TGA-reacted chips was charged with 1500 ml. of substantially pure monoethanolamine in a glass reaction kettle, heated gradually for approximately 50 minutes to 140–150° C. and then maintained near 150° C. under reflux for a period of 1 hour. Thereafter the reaction mixture was allowed to cool over a 40–50 minute period, after which the resulting pulp was separated from the extraction liquor by filtration. The crude pulp was then washed thoroughly with hot water, mechanically defibrated with water in a laboratory Sprout-Waldron pre-refiner, and screened to remove the residual liquor and provide a uniform product for testing.

The other portion of the TGA-reacted pine chips and 1500 ml. of aqueous liquor, containing 15 grams of sodium hydroxide to yield a 1% NaOH solution, were charged into the same pressure digester employed for the initial TGA treatment. The mixture was heated gradually to 150° C. over a 50-minute period, maintained thereat and at nearly 63 pounds gauge pressure for 1 hour, and then cooled over a 40–50 minute period to approximately 95° C. in order to simulate the conditions of the monoethanolamine extraction. The resulting pulp was recovered, washed and defibrated, as was done with the pulp from the MEA treatment.

The cellulosic pulp obtained as described above was then made into papers for testing in the following manner:

The wet cellulosic pulp obtained as described above was dried to 20–30% solids, then made into 8″ x 8″, 26 lb./m.s.f. basic weight handsheets for testing in the following manner: A minima of three aliquots of the experimental pulp, in an amount based on the oven-dried weight of the wet pulp, were refined with water at 1% consistency for varying periods of time in a Mead Laboratory Refiner (manufactured by The Bauer Bros. Co., Springfield, Ohio). The degree to which each pulp aliquot was refined, as determined by measuring the drainage rate of the pulp in a "Slowness Tester" (manufactured by Williams Apparatus Co., Watertown, N.Y.), was controlled as much as possible so as to provide three or more refining points bracketing 55 seconds Williams Slowness. Each of the refined pulp slurries was diluted to 0.5% consistency and uniformly mixed prior to making the handsheets. The handsheets were formed in an 8" x 8" Williams sheet mold from aliquots of the pulp slurry that were measured volumetrically for producing 26 lb.%m.s.f. sheets. The pulp consistency on forming the sheets was adjusted to 0.05% by further dilution of the pulp aliquot in the mold. The seven or more sheets (wet webs) formed from each batch of pulp slurry were couched from the wire of the mold onto standard 12" x 12" TAPPI blotters, then stacked between blotters with six blotters separating the sheets. The stack was then pressed for 5 minutes at 150 p.s.i. gauge pressure on a Williams press (manufactured by Williams Apparatus Company). The pressed sheets, retained on the couch blotters, were dried at 260–280° F. on a steam-heated Noble and Wood drier, with the sheet contacting the drum for approximately 2 minutes. After removing listed under the columns headed "Tensile," "Tear," "Mullen," "Ring Crush" and "Brightness" are the results obtained when the respective handsheets are tested using apparatus and procedures set forth where indicated below:

|  | TAPPI Standard |
|---|---|
| "Density" | T411 m–44 |
| "Basis weight" | T410 os–61 |
| "Tensile" | T404 os–61 |
| "Tear" | T414 ts–64 |
| "Mullen" | T403 ts–63 |
| "Ring crush" | T472 m–51 |
| "Brightness" | T452 m–58 |

The only exceptions from the above-identified test methods were that 5 sheets, each 49 square inches in area, were used in the "Density" and "Basis Weight" tests.

The tabulated values are adjusted for 26 lb./m.s.f. basis weight paper and for pulp refined to 55 seconds Williams Slowness. The values were determined from the results of test on the three sets of handsheets that were made from each test pulp as described above.

Tables I–A and I–B follow. In Table I–B, as well as in Tables II–B, III–B, IV–B and V–B which follow, the dry tensile is reported in lbs./in. and p.s.i., the reported p.s.i. value being calculated from the measured tensile (lb./in.) and caliper of the paper.

TABLE I–A.—TGA BLACK GUM COOKS AT INITIAL pH OF 7.0, VARIATION OF EXTRACTION CONDITIONS

| | Cooking conditions | | | | | Pulp data | | | | |
|---|---|---|---|---|---|---|---|---|---|---|
| | Chem./100 g. wood | pH range | Temp., °C. | Time, hrs. | Extraction conditions | Percent yield | Percent lignin | Percent CHO [1] yield | Mead refine time, sec. | Williams slowness, sec. |
| Cook No.: | | | | | | | | | | |
| 1–A | 6.4 g. TGA / 2.4 g. NaOH | 7.0 (initial) to 4.5 | 150 | 2 | 1% aq. NaOH; 1 hr. at 150° C. | 63.7 | 25.2 | 47.6 | 119 | 55.0 |
| 1–B | 6.4 g. TGA / 2.4 g. NaOH | ----do---- | 150 | 2 | 100% MEA [2]; 1 hr. at 140° to 150° C. | 56.3 | 12.6 | 49.2 | 97 | 55.0 |

[1] CHO = Pulp carbohydrate; percent yield is based on initial weight of wood.
[2] MEA = Monoethanolamine.

TABLE I–B.—TESTS ON 26 lb./MSF PAPERS MADE FROM PULPS OF COOK NOS. 1–A AND 1–B

| Papers from Cook No. | Density, p.c.f. | Dry tensile | | Tear, g./16 sh. | Mullen, p.s.i. | Ring crush, lbs. | Brightness, percent |
|---|---|---|---|---|---|---|---|
| | | Lbs./in. | P.s.i. | | | | |
| 1–A | 29.8 | 35.1 | 3,350 | 127 | 62 | 67 | 24 |
| 1–B | 30.0 | 44.6 | 5,000 | 132 | 81 | 63 | 29 | the blotters, the dried sheets were conditoned at 50% relative humidity and 73° F. for a minimum of 24 hours before testing.

More detailed information on the cook and extraction conditions and the results obtained are given in Table I–A. The value for the pulp characteristic listed as "Lignin" is the result obtained when the pulp is tested for acid-insoluble lignin using the apparatus and procedure set forth in TAPPI Standard Test Method T222 m–54. The "Williams Slowness" test, which measures the rate in seconds per liter at which one liter of pulp at 0.3% consistency drains at 20° C. in the Williams Slowness instrument, was used as previously described in order to measure the degree to which the pulp was refined in the Mead refiner. The time in seconds for refining the pulp in the Mead refiner to 55 seconds Williams Slowness, as was determined from the three refinings made, is listed in the column of Table I–A headed "Mead Refine Time."

The results of tests on papers (handsheets) made from the pulps produced as described in Table I–A are given in Table I–B. The values for the paper characteristics From the results of the handsheet tests shown in Table I–B it will be noted that the use of MEA for extracting mercaptan-reacted lignin from the woody material that results from digesting black gum hardwood with TGA yielded papers that were markedly superior in brightness (29 vs. 24), dry tensile strength (44.6 vs. 35.1 at 55 seconds Williams Slowness), and mullen (81 vs. 62) to papers obtained when a 1% solution of aqueous sodium hydroxide was employed as an extractive agent. Using MEA as an extractant, it will be further noted that the values for tear and ring crush were comparable to those obtained with the 1% NaOH solution.

In addition to the better paper properties obtained when MEA is employed as an extractive agent for the mercaptan-reacted lignin, the pulp data in Table I–A show that MEA is much more specific than is 1% aqueous NaOH in removing the aforesaid lignin from the treated wood. Evidence of this fact is found in the higher yield of pulp carbohydrate (49.2% vs. 47.6%) and the more complete delignification (12.6% vs. 25.2%) that are achieved by using MEA as compared with aqueous alkali.

It is further pointed out and emphasized that this example shows that the pulp obtained from black gum wood (a hardwood) by the process of this invention can be made into papers having exceptionally good properties (especially in tensile strength, mullen and brightness) for papers produced from a hardwood pulp.

Example 2

This example illustrates the preparation of pulps at 75–76% yield from the treatment of pine (a softwood) at an initial pH of 11.0 with a treating agent comprising a combination of TGA and sodium sulfhydrate, NaSH, followed by extraction with a 4% aqueous NaOH solution in one case and with 100% MEA in another. The apparatus and general procedure employed for both the initial digestion and subsequent extraction of mercaptan-reacted lignin retained by the treated pinewood were the same as described under Example 1 except that two separate 400-g. charges of the isopropanol-extracted chips (based on the O.D. weight) were cooked with the TGA-NaSH liquor. One batch of the treated chips was then extracted with 4% aqueous NaOH at reflux temperature for 1 hour, while the other was gradually heated to 140°–150° C. in 100% MEA, and then held at that temperature for 1 hour. The extracted chips from both extractions were recovered and washed immediately at the end of the extraction period without cooling the extraction mixture.

More detailed information on the cooking and extraction conditions and the results obtained are given in Table II–A. The results of tests on handsheets made from pulps produced as described in Table II–A are given in Table II–B.

Tables II–A and II–B follow.

the extraction of organomercaptan-reacted lignin, specifically thioglycolic acid-reacted lignin, from pine wood at comparable pulp yields.

The superior efficiency of MEA over aqueous NaOH in removing organomercaptan-reacted lignin from the treated wood is more evident in Example 2 than in Example 1. The high-yield pulp from the MEA-extracted wood contains much more carbohydrate and, at a comparable yield, less lignin than does the pulp from the TGA-treated pinewood chips that have been extracted with aqueous NaOH.

The results of the tests on the handsheets show that the high-yield pulp obtained when MEA was used as the extractant yields papers having significantly superior properties, specifically dry tensile, tear, mullen and ring crush, as compared with those obtained when aqueous NaOH is used to extract the lignin from the treated wood. It is also particularly to be noted that the data presented in Tables II–A and II–B show that the process of this invention provides a pulp having an exceptionally high yield (75%) combined with the aforementioned superior properties of papers made therefrom.

Example 3

This example illustrates the treatment of pine at an initial pH of 11.0, using a combination of TGA and a larger percentage amount of NaSH than was used in Example 2. The apparatus and general procedure employed for both the initial digestion and subsequent extraction of mercaptan-reacted lignin retained by the treated pinewood were the same as described under Example 1, except for the extraction of the treated chips of Cook No. 3–A with 2% NaOH at 100° C., in which case the extraction was done in the same manner as was carried out with 4% NaOH as described under Example 2. Extractions of the mercaptan-reacted lignin were made with 100% MEA for 1 hour at 150° C.; and, for comparative purposes, also with a 1% aqueous solution of NaOH at 150° C.. and with 2% aqueous solutions of NaOH at both 100° C. and 150° C.

Other and more detailed information on the cooking and extraction conditions and the results obtained are given in Table III–A. The results of tests on handsheets made from pulps produced as described in Table III–A are given in Table III–B.

Tables III–A and III–B follow.

TABLE II–A.—TGA PLUS NaSH PINE COOKS AT INITIAL pH OF 11.0 AND VARIATION OF EXTRACTION CONDITIONS

| | Cooking conditions | | | | | Pulp data | | | | |
|---|---|---|---|---|---|---|---|---|---|---|
| Cook No. | Chem./100 g. wood | pH range | Temp., °C. | Time, hrs. | Extraction conditions | Percent yield | Percent lignin | Percent CHO [1] yield | Mead refine time, sec. | Williams slowness, sec. |
| 2–A | 6.4 g. TGA, plus 1.8 g. NaSH plus 4.6 g. NaOH. | 11.0 to 8.3 | 150 | 2 | 4% aq. NaOH; 1 hr. at 100° C. | 75.8 | 25.5 | 56.5 | 177 | 55.0 |
| 2–B | 6.4 g. TGA plus 1.8 g. NaSH plus 4.8 g. NaOH. | 11.0 to 8.5 | 150 | 2 | 100% MEA [2]; 1 hr. at 140°–150° C. | 75.0 | 18.6 | 61.0 | 192 | 55.0 |

[1] CHO=Pulp carbohydrate; percent yield is based on initial weight of wood.
[2] MEA=Monoethanolamine.

TABLE II–B.—TESTS ON 26 lb./MSF PAPERS MADE FROM PULPS OF COOK NOS. 2–A AND 2–B

| Papers from Cook No. | Density, p.c.f. | Dry tensile Lbs./in. | Dry tensile P.s.i. | Tear, g./16 sh. | Mullen, p.s.i. | Ring crush, lbs. |
|---|---|---|---|---|---|---|
| 2–A | 28.8 | 35.5 | 2,850 | 109 | 57 | 56 |
| 2–B | 32.7 | 48.3 | 4,890 | 119 | 77 | 68 |

The results of the tests described in Examples 1 and 2 show the comparative effectiveness of an amidogen extractant, specifically monoethanolamine, and an inorganic alkaline extractant, more particularly aqueous NaOH, in TABLE III–A.—TGA PLUS NaSH PINE COOKS AT INITIAL pH OF 11.0 AND VARIATION OF EXTRACTION CONDITIONS

| | Cooking conditions | | | | | Pulp data | | | | |
|---|---|---|---|---|---|---|---|---|---|---|
| Cook No.: | Chem./100 g. wood | pH range | Temp., °C. | Time, hrs. | Extraction conditions [1] | Percent yield | Percent lignin | Percent CHO [2] yield | Mead refine time, sec. | Williams slowness, sec. |
| 3–A | 12.8 g. TGA plus 5.1 g. NaSH plus 9.3 g. NaOH. | 11.0 to 9.3 | 160 | 2 | 2% aq. NaOH at 100° C. | 68.7 | 20.5 | 54.6 | 170 | 55.0 |
| 3–B | do | do | 160 | 2 | 1% aq. NaOH at 150° C. | 64.4 | 20.8 | 51.0 | 150 | 55.0 |
| 3–C | do | do | 160 | 2 | 100% MEA [3] at 150° C. | 65.2 | 15.0 | 55.4 | 150 | 55.0 |
| 3–D | do | do | 160 | 2 | 2% aq. NaOH at 150° C. | 60.4 | 16.8 | 50.3 | 150 | 55.0 |

[1] 1 hr. at the specified temperature in all extractions.
[2] Pulp carbohydrate; percent yield is based on initial weight of wood.
[3] MEA=Monoethanolamine.

TABLE III-B.—TESTS ON 26 lb./MSF PAPERS MADE FROM PULPS OF COOKS OF TABLE III-A

| Papers from Cook No. | Density, p.c.f. | Dry tensile Lbs./in. | P.s.i. | Tear, g./16 sh. | Mullen, p.s.i. | Ring crush, lbs. | Brightness, percent |
|---|---|---|---|---|---|---|---|
| 3-A | 31.3 | 43.2 | 4,250 | 145 | 84 | 60 | 21 |
| 3-B | 33.0 | 46.3 | 4,610 | 173 | 95 | 56 | 19 |
| 3-C | 34.1 | 52.0 | 5,400 | 158 | 101 | 65 | 21 |
| 3-D | 34.3 | 49.5 | 5,215 | 182 | 98 | 56 | 20 |

The results (see Tables III-A and III-B) of the tests of this example show that, under the conditions employed for the pulping of pinewood (a softwood) by the method of the invention, a pulp was produced in an exceptionally high yield (65.2%) and which could be formed into paper having excellent properties, specifically excellent dry tensile strength, mullen, ring crush and brightness characteristics.

Compared to the extraction of TGA-treated pinewood with 2% aqueous NaOH at 150° C. (i.e., the same temperature used in extracting with MEA), the MEA-extracted TGA-reacted pine chips gave a pulp at a significantly higher yield (65.2% vs. 60.4%) from which could be made paper having properties which, except for tear, were equivalent or superior to papers made from similar pulps wherein 2% aqueous NaOH instead of MEA was used to extract the TGA-reacted lignin; that is, in dry tensile (52.0 vs. 49.5), mullen (101 vs. 98), ring crush (65 vs. 56) and brightness (21 vs. 20). At higher pulp yields, i.e., at yields near the yield obtained by MEA-extraction technique, papers made from such pulps exhibit inferior properties except for tear.

extraction of the mercaptan-reacted lignin were the same as described under Example 1. The aniline extraction was carried out at atmospheric pressure in a glass reaction vessel, while that with 50% aqueous urea was done in the pressure digester used in the initial cooking. After extraction, the aniline-saturated residue was thoroughly washed with isopropanol to remove the residual aniline before washing with water. The residue from the urea extraction was washed with hot water in the usual manner.

Tables IV-A and IV-B give more detailed information on the extraction conditions and the results obtained. The results of the tests establish that amidogen extractants other than MEA are effective in extracting organomercaptan-reacted lignin from organomercaptan-treated wood whereby a paper-making pulp is obtained. The data in the tables show that high-yield (69.5–71.5%) pulps having fair paper-making properties resulted when both urea and aniline were used as extractants under the specified conditions, even though the pulps retained a significant amount of lignin.

Tables IV-A and IV-B follow.

TABLE IV-A.—TGA PLUS NaSH PINE COOKS AT INITIAL pH OF 11.0 USING UREA AND ANILINE AS EXTRACTANTS

| | Cooking conditions | | | | | Pulp data | | | | |
|---|---|---|---|---|---|---|---|---|---|---|
| Cook No.: | Chem./100 g. wood | pH range | Temp., °C. | Time, hrs. | Extraction conditions | Percent yield | Percent lignin | Percent CHO [1] yield | Mead refine time, sec. | Williams slowness, sec. |
| 4-A | 12.8 g. TGA plus 5.1 g. NaSH plus 9.1 g. NaOH. | 11.0 to 9.3 | 160 | 2 | 50% aq. urea; 1 hr. at 150° C. | 71.5 | 23.5 | 54.7 | 120 | 55.0 |
| 4-B | do | do | 160 | 2 | 100% aniline; 1 hr. at 150° to 155° C. | 69.5 | 22.0 | 54.2 | 138 | 55.0 |

[1] CHO = Pulp carbohydrate; yield is based on initial weight of wood.

TABLE IV-B.—TESTS ON 26 lb./MSF PAPERS MADE FROM PULPS OF COOK NOS. 4-A AND 4-B

| Papers from Cook No. | Density, p.c.f. | Dry tensile Lbs./in. | P.s.i. | Tear, g./16 sh. | Mullen, p.s.i. | Ring crush, lbs. | Brightness, percent |
|---|---|---|---|---|---|---|---|
| 4-A | 30.8 | 44.5 | 4,380 | 138 | 84 | 56 | 17 |
| 4-B | 30.2 | 46.5 | 4,190 | 153 | 80 | 66 | 19 |

The pulp data given in Table III-A provides additional evidence of the high selectivity of an amidogen compound, specifically MEA, in removing TGA-reacted lignin from the treated wood. When MEA is used as an extractant the pulp contains much less lignin in proportion to the carbohydrate material than do any of the pulps obtained when aqueous NaOH is employed as an extractant.

It is also pointed out that papers made from pulps which are produced by the method of this invention have excellent properties even though the lignin content of the pulp is much higher than that of conventional pulps.

Example 4

The preparation of pulp from organomercaptan-treated wood by extraction with other amidogen compounds, specifically urea and aniline, is illustrated in this example.

As in Example 3, the apparatus and general procedure employed for both the initial digestion and subsequent Example 5

This example illustrates the use of an organomercaptan different from thioglycolic acid (TGA), specifically 2-mercaptoethanol, in practicing the present invention; and, more particularly, in the pulping of pinewood chips.

The same apparatus and general procedure described under Example 1 were employed for both the initial digestion and the extraction of the mercaptan-reacted lignin from the treated wood. More detailed information on the cooking and extraction conditions are given in Table V-A. The results of tests on handsheets made from pulps produced as described in Table V-A are given in Table V-B.

The results of the tests presented in Tables V-A and V-B show that the extraction of the 2-mercaptoethanol-treated pinewood with aqueous NaOH under the specified conditions made it possible to obtain pulps from which could be made papers having, except for brightness value, fairly good properties at 62.5% pulp yield. However, at higher pulp yields (67.1%–68.8%), the tensile, tear and mullen properties dropped off significantly. In marked contrast, the use of MEA instead of aqueous NaOH as an extractant provided a high yield (70.3%) of pulp from which paper was made having a high, dry tensile strength (50.8 vs. 39.1–45.2) and a good mullen value (86 p.s.i.). The pulping data also show that there is a more selective removal of the organomercaptan-reacted lignin with less loss of carbohydrates when an amidogen compound, specifically monoethanolamine, is employed as compared with the use of an inorganic alkaline compound, more particularly aqueous NaOH, as an extractant.

Tables V–A and V–B follow.

aniline, an alkanolamine such as monoethanolamine, or with an amide, e.g., urea. Extraction is continued until there is obtained an extracted wood from which mercaptan-reacted lignin has been removed in the optimum amount desired for the particular end-use of the pulp such as, for example, chemical or alpha-cellulose, a particular grade or quality of paper, liner board, etc.

We claim:

1. The method of pulping lignocellulosic material by a two-stage treatment which includes the steps of
   (A) digesting said material with a treating liquor containing an agent reactive with the said lignocellulosic material and which is comprised of an organomer- TABLE V–A.—2-MERCAPTOETHANOL PINEWOOD COOKS AT INITIAL pH OF 12.0, VARIATION OF EXTRACTION CONDITIONS

| | Cooking conditions | | | | | Pulp data | | | | |
|---|---|---|---|---|---|---|---|---|---|---|
| Cook No.: | Chem./100 g. wood | pH range | Temp., °C. | Time hrs. | Extraction conditions | Percent yield | Percent lignin | Percent CHO [2] yield | Mead refine time, sec. | Williams slowness, sec. |
| 5-A | 12.7 ME [1] plus 7.7 g. NaOH | 12.0 to 8.7 | 170 | 2 | 1% aq. NaOH; 1 hr. at 150° C. | 67.1 | 25.0 | 50.3 | 168 | 55.0 |
| 5-B | 12.7 ME plus 6.9 g. NaOH | 12.0 to 8.3 | 170 | 2 | 2% aq. NaOH; 1 hr. at 130° C. | 68.8 | 25.6 | 51.2 | 175 | 55.0 |
| 5-C | 12.7 ME plus 8.0 g. NaOH | 12.0 to 9.0 | 170 | 2 | 2% aq. NaOH; 1 hr. at 150° C. | 62.5 | 22.7 | 48.3 | 188 | 55.0 |
| 5-D | 12.7 ME plus 6.9 g. NaOH | 12.0 to 8.3 | 170 | 2 | 100% MEA; 1 hr. at 145°–150° C. | 70.3 | 22.7 | 54.3 | 171 | 55.0 |

[1] ME = 2-mercaptoethanol.
[2] CHO = Pulp carbohydrate; percent yield is based on initial weight of wood.

TABLE V–B.—TESTS ON 26 lb./MSF PAPERS MADE FROM PULPS OF COOKS OF TABLE V–A

| Papers from Cook No. | Density, p.c.f. | Dry tensile Lbs./in. | Dry tensile P.s.i. | Tear, g./16 sh. | Mullen, p.s.i. | Ring crush, lbs. | Brightness, percent |
|---|---|---|---|---|---|---|---|
| 5-A | 32.0 | 45.2 | 4,620 | 156 | 78 | 64 | 14.7 |
| 5-B | 34.4 | 39.1 | 4,320 | 153 | 76 | 66 | 14.6 |
| 5-C | 34.0 | 45.0 | 4,500 | 168 | 87 | 61 | 13.9 |
| 5-D | 34.5 | 50.8 | 5,650 | 135 | 86 | 68 | 14.8 |

From the foregoing description it will be seen that the present invention provides a method of pulping raw lignocellulosic material, in chip or other suitable form, e.g., chips of hardwood, softwood or mixtures thereof in any proportions by a two-stage treatment which includes the steps of:

(A) Digesting said material with a treating liquor containing an agent reactive with the said lignocellulosic material and which is comprised of an organomercaptan, e.g., thioglycolic acid, in an amount corresponding to at least 2.5 weight percent based on the weight of the oven-dried lignocellulosic material. The treating liquor has an initial pH not substantially exceeding 12.0, e.g., from 7.0 to about 11 or 11.5. The treating liquor may contain a minor amount (i.e., less than 50 weight percent) of the total mercaptan content of an inorganic mercaptan, e.g., sodium sulfhydrate. The temperature and time of digestion are sufficient to convert the raw lignocellulosic material to a treated material containing mercaptan-reacted lignin.

(B) At the end of the above-described digestion period, the excess liquor is removed by any suitable means from the digester, e.g., by draining, siphoning, etc., thereby separating the excess liquor from the treated material resulting from step A. Preferably the residue that remains after removing the excess liquor from the organomercaptan-treated lignocellulosic material is washed, e.g., with water and, more particularly, with hot water.

(C) Mercaptan-reacted lignin retained by the digested lignocellulosic material, and from which excess liquor has been removed and, preferably also has been washed, is extracted by contacting the drained (or both drained and washed) residue with an extractive amidogen compound. Extraction may be effected with an amine, including captan in an amount corresponding to at least about 2.5 weight percent based on the weight of the oven-dried lignocellulosic material, said treating liquor having an initial pH not substantially exceeding 12.0, the temperature and time of digestion being sufficient to convert the lignocellulosic material to a treated material containing mercaptan-reacted lignin;

(B) removing the excess liquor from the treated material from step A; and (C) extracting mercaptan-reacted lignin retained by the digested lignocellulosic material, and from which excess liquor has been removed, by contacting the residue with an extractive amidogen compound.

2. The method as in claim 1 wherein the lignocellulosic material is hardwood.

3. The method as in claim 1 wherein the lignocellulosic material is softwood.

4. The method as in claim 1 which includes the step of washing the residue that remains after removing the excess liquor from the organomercaptan-treated lignocellulosic material.

5. The method as in claim 1 wherein the organomercaptan is one represented by the general formula $$HS-Z-(COOR)_n$$

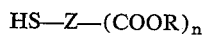

wherein Z represents an alkylene radical containing from 1 through 10 carbon atoms; R represents a member of the group consisting of (a) hydrogen, (b) alkyl radicals containing not more than 10 carbon atoms, and (c) a salt-forming cation; and $n$ represents an integer from 1 up to that of the combining power of the alkylene radical represented by Z; and which includes the step of washing the residue that remains after removing the excess liquor from the organomercaptan-treated lignocellulosic material.

6. The method as in claim 5 wherein the organomercaptan is one represented by the general formula $$HS-(CH_2)_n-COOR$$

wherein $n$ represents an integer from 1 to 8, inclusive, and R represents a member of the group consisting of (a) hydrogen, (b) alkyl radicals containing not more than about 8 carbon atoms, and (c) a salt-forming cation.

7. The method as in claim 6 wherein the organomercaptan is thioglycolic acid.

8. The method as in claim 1 wherein the extractive amidogen compound is an amine; and which includes the step of water-washing the residue that remains after removing the excess liquor from the organomercaptan-treated lignocellulosic material.

9. The method as in claim 1 wherein the extractive amidogen compound is an amide; and which includes the step of water-washing the residue that remains after removing the excess liquor from the organomercaptan-treated lignocellulosic material.

10. The method as in claim 8 wherein the amine is an alkanolamine.

11. The method as in claim 9 wherein the amide is urea.

12. The method as in claim 1 wherein the organomercaptan is thioglycolic acid; the extractive amidogen compound is monoethanolamine; and which includes the step of washing the residue that remains after removing the excess liquor from the thioglycolic acid-treated lignocellulosic material.

13. The method as in claim 1 wherein the treating liquor has an initial pH not exceeding 12.0; the organomercaptan is present in the treating liquor in an amount corresponding to from about 2.5 to about 50 weight percent based on the weight of the oven-dried lignocellulosic material; the digestion temperature is within the range of from 50° C. to 200° C.; and which includes the step of washing the residue that remains after removing the excess liquor from the organomercaptan-treated lignocellulosic material.

14. The method as in claim 1 wherein the organomercaptan is thioglycolic acid; the treating liquor has an initial pH not substantially exceeding 12.0; the said thioglycolic acid is present in the treating liquor in an amount corresponding to from about 5 to about 25 weight percent based on the weight of the oven-dried lignocellulosic material; the digestion temperature is within the range of from about 95° C. to about 190° C.; and which includes the step of washing the residue that remains after removing the excess liquor from the thioglycolic acid-treated lignocellulosic material.

15. The method as in claim 1 wherein the organomercaptan is thioglycolic acid; the treating liquor has an initial pH not exceeding about 11.0; the said thioglycolic acid is present in the treating liquor in an amount corresponding to from about 5 to about 25 weight percent based on the weight of the oven-dried wood; the digestion temperature is within the range of from about 150° C. to about 180° C.; the extractive amidogen compound is monoethanolamine; and which includes the step of washing the residue that remains after removing the excess liquor from the thioglycolic acid-treated lignocellulosic material.

16. The method as in claim 15 wherein the extractive amidogen compound is aniline.

17. The method as in claim 15 wherein the extractive amidogen compound is urea.

18. The method as in claim 1 wherein the organomercaptan is thioglycolic acid; the treating liquor has an initial pH not exceeding 7; the said thioglycolic acid is present in the treating liquor in an amount corresponding to from about 5 to about 25 weight percent based on the weight of the oven-dried wood; the digestion temperature is within the range of from about 150° C. to about 180° C.; the extractive amidogen compound is monoethanolamine at a temperature within the range of from ambient temperature to 150° C.; and which includes the step of washing the residue that remains after removing the excess liquor from the thioglycolic acid-treated lignocellulosic material.

19. The method as in claim 1 wherein the treating liquor contains a minor amount, of the total mercaptan content, of sodium sulfhydrate.

References Cited

Wood Chemistry, Wise & Jahn, 2nd edition, Vol. I, pub. by Reinhold Pub. Corp. (New York), 1952, pp. 435 and 498.

HOWARD R. CAINE, Primary Examiner

U.S. Cl. X.R.

162—71, 77